United States Patent Office 3,522,196
Patented July 28, 1970

3,522,196
THERMOSETTING RESIN FOAMS AND METHOD FOR THEIR PREPARATION
Paul Dorier, Lyon, and Jacques, Potier, Clamecy, France, assignors to Plastugil, Lyon, France, a French body corporate
Filed Nov. 7, 1966, Ser. No. 592,478
Claims priority, application France Nov. 12, 1965, 38,087; July 21, 1966, 70,240
Int. Cl. C08g 51/78, 53/10
U.S. Cl. 260—2.5
9 Claims

ABSTRACT OF THE DISCLOSURE

An hydrous, non-acid and non-corrosive foams are obtained from thermosetting formaldehyde condensation resins by employing during the foaming of said resins a hardening catalyst having a high acidity and volatile at 100–140° C., drying the hardened foams within said temperature range and thereafter neutralizing the residual acid with a gaseous alkaline agent.

Figure 1:
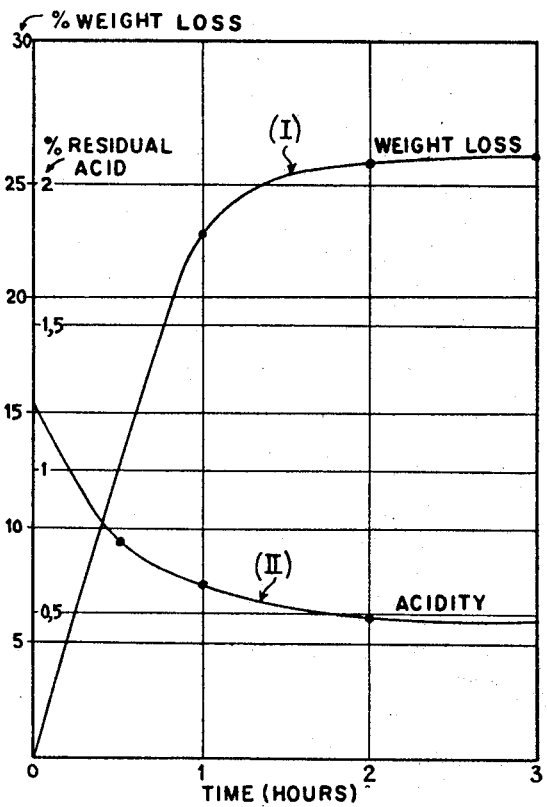

The present invention relates to foams obtained from resins which are thermosettable by means of an acid catalysis, that is, foam resins having as essential constituent the product of condensation of formaldehyde with a phenol, an amino derivative or a mixture of both.

Such foams have been obtained a very long time ago. The usual method of preparing them employs thermosetting resins in an aqueous or organic solution in a volatile solvent which is heated in the presence of a foaming agent and a acid hardening agent.

The foam panels, slabs or blocks thus obtained contain a high percentage of water on the order of 15–30%, and a large amount of residual acid, on the order of a few percent. The presence of these two elements, namely the water and the acid, is a serious drawback in the subsquent utilization of these foams.

Indeed, the foam panels or blocks must be very stable over a period of time as concerns their dimensions and weight. If these two conditions are not satisfied, unfortunate consequences result, above all in the case of the utilization of the foam in the construction of composite panels with various lateral coverings. This application is becoming more and more widespread, above all in the various sections of the building industry, and requires products of high quality. If the aforementioned conditions as concerns dimensions and weight are not satisfied, the constituent elements of the assembly become deformed or detached with time which is unacceptable. The presence of a high percentage of water encourages these defects.

Further, the large amount of residual acid results in a rapid corrosion of all the metal parts which might come in contact with the foam and this partically forbids utilization of the foam in a large number of possible applications if risk of corrosion is to be avoided.

The development of thermosetting foams has been largely hindered up to the present time by these two serious drawbacks.

Various remedies have already been proposed.

Attempts have been made to avoid the presence of water and acid by employing in the case of phenol resins a novolak phenol resin which is anhydrous and can be hardened by an alkaline catalyst such as tetramine hexamethylene.

These resins have the drawback of being in the form of a solid which is fusible at room temperature and, when put in solution, reacts with its alkaline hardening agent very rapidly at medium temperatures. This is liable to hinder the normal possibilities of the foaming and produce foams which have a very high density and are of limited utilization. Consequently, it is necessary to mix the novolak and the foaming agent in an organic solvent at a temperature high enough to ensure that the viscosity of the novolak is low enough to permit a good mixing, thereafter to cool this mixture, crush it and mix it with the alkaline hardening agent in powdered form.

In practice, these novolaks are not used alone since the presence of various other resins is required (alkyl phenols, alkyl siloxanes, polyvinyl alcohol, polyvinyl acetate etc.). The eveness of the whole mixture is difficult to control. The foaming operation is delicate to carry out owing to the rapid reaction of the novolak and alkaline hardening agent at the sufficient temperature. Thus precautions have to be taken and in practice the operation is carried out over a period of around half an hour.

This utilization of novolaks is not industrial and it has not been possible to apply it to methods for continuously obtaining foams in accordance with present day developments. Consequently, it cannot be considered as a real development at the present time.

Utilization of resol type phenol resins has therefore been resumed. Partial solutions have been proposed to avoid the presence of water, namely:

Utilization of resins devoid of water in a very volatile organic solvent medium, but the catalysis is always carried out in an acid medium and the foams obtained are also corrosive.

Utilization of aqueous resins with a hardening agent producing an acid with emanation of heat by reaction with the water or the resin (utilization of an anhydride). The foams obtained are always very corrosive owing to the acid and the presence of traces of water which with time produce an ionic corrosion.

Other partial solutions have been proposed for eliminating the acid:

Neutralization of the residual acidity by means of gaseous ammonia or gaseous alkylamine. The foam thus obtained still contains water and is still just as corrosive owing to the presence of a high percentage of acid reaction salts which are not eliminated and which with time become still more corrosive subsequent to ionization due to the presence of water.

Incorporation in the foaming stage of a latent neutralizing agent coated with a protective material which loses its protective property at the end of the foaming operation. The latent agent can then perform its function and neutralize the acid present. Products are employed which produce salts with the acid which are insoluble in water thereby avoiding the ionic corrosion. The foams obtained are less corrosive but it has been found that they retain a marked corrosive character owing to the high percentage of acid reaction salts remaining in the foam. Further, this neutralization is not immediate and it is difficult to be sure that it is complete over a period of time. Thus the danger of corrosion is just as serious.

The last two solutions have confounded neutralized foams with non-corrosive foams, whereas tests carried out by the Applicant have revealed that neutralized foams are corrosive.

It is clear from the foregoing that the utilization of resins which are thermosettable by an acid catalysis, capable of normal conservation over a period of time and convertible into a foam at medium temperature in the presence of a blowing agent and a strong acid, is at the present time the sole that can be contemplated to ensure in the course of foaming a very good synchronization between the formation of this foam and the hardening reaction so that the foam has a low density and wide possibilities of industrial development. However, this industrial development was held up by the fact that the obtainment of industrial anhydrous and non-corrosive thermosetting foams by the neutralization of a resin thermosettable in an acid catalysis had not been correctly worked out.

The invention provides the solution to this problem in that it provides an anhydrous non-corrosive thermosetting foam resulting from a hardening in an acid medium. This group of properties identifies this foam and renders it a new industrial product which is also covered by the invention.

The non-corrosiveness of this foam results from not only the absence of free acid but also the presence of very small amounts of salts, whereas previously neutralized foams contained large amounts of these salts which rendered them corrosive.

To prepare the new thermosetting foam, a method is employed which is also covered by the invention. This method comprises a combination of means employed successively and in a given order. It comprises employing, in the course of the foaming of a resin thermosettable in an acid catalysis in an aqueous or organic solution in a volatile solvent containing a foaming agent and if desired the usual adjuvants, an acid hardening catalyst which has a high acidity and is volatile at the subsequent drying temperature, drying the hardening foam thus obtained at the tempmerature of 100–140° C., and preferably 100–130° C., for about 1–3 hours so as to expel the water or the volatile solvent and the major part of the acid contained in the foam, and thereafter neutralizing the residual acid by means of a gaseous alkaline agent.

The various stages of the method and their essential features will be examined hereinafter in greater detail.

The procedure for foaming the resin which is thermosettable in an acid catalysis is carried out in a generally conventional manner. Thus, it is possible to employ the usual foaming agents, such as light hydrocarbons alone or in mixture. As the usual adjuvants of the foaming mixture there could be used if desired surface active agents, modifying resins, fillers, etc., all of which products are well known to the specialist. The critical feature of this stage is the utilization of an acid hardening catalyst which satisfies the following two conditions:

It must be strong enough to permit the synchronization between the foaming and the hardening.

It must be volatile at the subsequent drying temperature so as to be eliminated in major part during this drying.

Acid salts and mineral or organic acids may be used as the catalysts satisfying these conditions. However, the preferred catalyst is hydrochloric acid. The drying following the foaming is carried out between 100 and 140° C. and preferably between 100 and 130° C. for about 1–3 hours. The upper limit of 140 °C. is dictated by the following consideration.

It is a currently-accepted threshold beyond which the foams are liable to undergo disturbance in the course of the drying (appearance of oxidation phenomena which could result in a rapid combustion of the foam; this could be avoided by the addition of adequate products— start of carbonization of the foam which alters its properties—possible bursting of the foam as a function of the percentage of open cells). This drying has a double purpose.

It eliminates the water or the volatile solvent in the foam.

It eliminates the major part of the acid in the foam, the percentage of elimination being the higher as the temperature of volatility of the acid differs from the drying temperature.

It is therefore the foam drying and thorough de-acidification stage. The amount of acid present in the foam, on the order of 2–4% after the first stage, becomes 0.15–0.6%, depending on the thickness of the panel treated, the drying time, the temperature, the acid employed and the percentage of open cells of the foam. As is known, the percentage of open cells can be determined in the manner described in "Rubber World" 1958, 138 May 261/264.

For example: a phenol foam panel having a thickness of 7 cm. and a foam with 53% of open cells requires a drying time of 2 hours 30 minutes at 130° C.

A panel of the same thickness obtained from a foam of the same type having 97% of open cells requires a drying time of 1 hour 30 minutes at 130° C. or 3 hours at 100° C.

The last stage of the method is that relating to the neutralization of the low residual acidity. Notwithstanding the extremely substantial drop in the percentage of acid remaining in the foam upon drying, the slight residual acidity is still too high to avoid a marked corrosive action of foams thus treated. It was possible to ascertain this by the accelerated corrosion test carried out at 110° C. with 100% of relative dampness for a period of 6 days. The foam resulting from the second stage completely corrodes the surface of a mild steel plate, the start of corrosion already being in an advanced stage after 3 hours of contact.

It is therefore necessry to continue the neutralization of the foam thus treated. For this the foam is subjected to a gaseous ammonia or a gaseous amine treatment or a treatment with any gaseous agent having an alkaline reaction.

The use of gaseous ammonia has already been proposed for the neutralization of undried phenol foams which still have all their acidity. However, as mentioned before, the foams obtained are still just as corrosive, as was revealed by the aforementioned test, owing to the high percentage of remaining ammonium salts and the ionic corrosion resulting from the presence of water.

On the other hand, in the course of the treatment according to the invention with a gaseous alkaline agent on a dry foam having a very low residual acidity, the percentage of remaining salts is very low and does not result in a corrosive character of the foam. Further, there is no danger of ionic corrosion.

From the practical point of view, the treatment of the gas on a dried foam results in an improved penetration of this gas in the foam. Further, this penetration of the gas in the dried foam can be still further enhanced by previously placing the material in a vacuum before introducing the gas. The rate of penetration of the gas is a function of the quality of the vacuum, of the percentage of open cells of the foam and of the thickness of the panel. For example, for a foam having 45% of open cells of a panel having a thickness of 15 cm. treated with ammonia for 45 minutes, the influence of the prior vacuum is very marked. With a 10 cm. vacuum, 25% of the volume of the panel is neutralized. It is as much as 54% with a 40 cm. vacuum and 68% with a 60 cm. vacuum.

The penetration of the gas in the dried foam can also be increased by treating the foam with a gaseous alkaline agent under pressure. Thus it is possible, owing to these various means, to effect the neutralizing treatment in a period of time which is compatible with mass-production of the foam by both a continuous and a discontinuous method and obtain an anhydrous non-corrosive foam which has no need to be once more put into the oven for eliminating the last traces of volatile salts that it might still contain.

By means of the accelerated corrosion test it was possible to reveal the critical character of the conditions and of the order of the stages of the method according to the invention for obtaining an anhydrous non corrosive foam.

Indeed, if a strong acid catalyst which is non-volatile at the drying temperature is employed, the second stage is merely a drying stage and no longer a thorough de-acidification stage. The dried foam thus obtained still containing all the acid employed, which is neutralized in the third stage, will then have a high percentage of acid reaction salts which still have a very marked corrosive character and this is unacceptable for practical purposes.

Thus, the foaming of the resin was tried in the presence of sulphuric acid which is non-volatile at the drying temperature. An extraction with the Soxhlet apparatus carried out on a specimen of dried foam, revealed a pH of 4. The dried foams subsequently neutralized with ammonia gas have a high percentage of ammonium sulphate which still renders them just as corrosive, even if a further stoving of the neutralized dried foam is carried out. This was ascertained experimentally by means of the accelerated corrosion test.

If a strong acid catalyst which is volatile at the drying temperature is employed in the foaming stage and the drying and neutralizing stages are thereafter reversed, there is obtained a neutralized foam containing a high percentage of more or less acid reaction salts which are not necessarily volatile at the subsequent drying temperature. It was ascertained on a foam catalyzed with hydrochloric acid that the penetration of the ammonia was much slower in respect of the moist foam and that the ammonium chloride obtained upon neutralization remained in the foam in a very appreciable amount after the drying stage. An extraction of a specimen with the Soxhlet apparatus revealed a pH of 5.5. The foams thus obtained are still distinctly corrosive as the accelerated corrosion test revealed. A previously-polished mild steel plate is completely blackened within 48 hours.

In order to be sure of obtaining a non-corrosive foam, it is therefore necessary to carry out the drying stage before the neutralizing stage, since the prior drying necessarily brings about a very thorough de-acidification owing to the use of an acid catalyst which is necessarily volatile at the treating temperature. On the other hand, the salts resulting from the neutralizaion of the acid do not necessarily have the same volatility at the same temperature.

As an extreme possibility, the drying and neutralization could be carried out jointly by the gaseous alkaline agent. This would be difficult to achieve in a practical way for eliminating the hot alkaline agent and, furthermore, would be liable to result in a relatively high percentage of acid reaction salts which would not be necessarily volatile at the drying temperature and the foams obtained would therefore still be corrosive.

The neutralization could also be carried out by means of an aqueous solution of ammonia on a material under a vacuum. The penetration in the foam is rather limited but the neutralization is however possible in certain cases where the percentage of the open cells of the foam is very high. However, this procedure is of no practical interest owing to much slower rate of penetration compared to that of gaseous ammonia and to an additional supply of water which would also have to be eliminated.

There will now be mentioned the results of some accelerated corrosion tests which substantiate the foregoing. The test conditions were as follows.

Small plates of metal are sandwiched between two foam test pieces or specimens and placed in a closed container containing 100 cc. of water. The assembly or sandwich is not in contact with the water. Also disposed in the container is a small plate of metal which is in the same atmosphere as the foam without being in contact with the latter.

In these sandwich assemblies, the foam is in contact with the metal but tests are also carried out in which the foam is in the vicinity of the metal without being in contact.

The containers are closed and placed in an oven at 110° C. for 6 days.

At the end of these six days, the plates of metal are cleaned of their products of corrosion by chemical means and weighed.

The corrosion of the metal is expressed by the difference between the initial weight and the weight after cleaning.

The tested metals are the following: copper, mild steel, stainless steel NS22S.

The results are summarized in the following table, in which the values in the column "Dried Neutralized Foam," which are the only values corresponding to the foams according to the invention, show the obvious superiority of the latter.

These results also show that a foam specimen in the vicinity of the metal is roughly just as corrosive of the metal as it is in direct contact with the latter.

DIFFERENCE IN WEIGHT (MILLIGRAMS)

| Metal | Position of the metal plate | No foam reference Test | Dried neutralized foam | Dried non-neutralized foam | Undried neutralized foam | Undried neutralized foam subsequently dried |
|---|---|---|---|---|---|---|
| Copper | In contact with foam | −11.5 | +0.1 | −21.1 | −18.3 | |
|  | In vicinity |  | +1.1 | −23.1 | −19.3 | |
| Mild steel | Contact | −75.0 | −13.6 | −82.2 | −60 | −45 |
|  | In vicinity |  | −19.6 | −83.0 | −59 | −60 |
| Stainless steel | Contact |  | −0.5 | −18.3 | −1 | |
|  | In vicinity | −3.4 | −0.3 | −8.2 | −0.3 | |

All these tests clearly show that the method for obtaining anhydrous and non-corrosive thermosetting foams depends on the combination of the following successive operations in the following order:

(a) The use in the course of foaming of a strong acid catalyst which is volatile at the foam drying temperature.

(b) A thorough drying and de-acidification of the foam at a temperature of 100–130° C. for a period of 1–3 hours.

(c) Neutralization of the slight residual acidity by means of a gaseous alkaline agent, this neutralization being carried out more rapidly and more completely by previously placing the anhydrous foam in a vacuum.

The anhydrous and non-corrosive thermosetting foam thus obtained does not require a further stoving. In order to avoid a slight resumption of moisture with time it could be insulated from surrounding conditions by pojecting a protective and insulating varnish over the whole of its surface.

The method described hereinbefore applies to foams of resins which are thermosettable in an acid catalysis procedure. Among the latter, can be mentioned in particular those obtained from the following resins generally forming part of the phenoplastic resin and aminoplastic resin categories:

Resol-type phenol resins in solution.

Resol-type phenol resins which are modified or mixed, in which a part of the phenol is replaced in the course of condensation with the formaldehyde by one or several constituents of thermosetting resins such as urea and melamine.

Modified or mixed resol-type phenol resins obtained by mixing at the foaming stage a phenol resin with one or several other thermosetting resins, such as formaldehyde-urea, formaldehyde-melamine, formaldehyde-urea-melamine resins.

Pure or modified aminoplastic resins resulting from the condensation of the 30% aqueous formaldehyde solution with urea, melamine or a mixture of both.

Pure or modified reosl-type or aminoplastic phenol resins containing thermoplastic products such as polystyrene in dispersion.

Phenol-aminoplastic-styrene mixed resins obtained either from the comon condensation of the monomer constituents or in the form of a mixture of resins which are more or less condensed so as to result in good compatibility of the final product.

There will now be described certain tests related to FIGS. 1–3 of the accompanying drawing which permit determining the optimum conditions of carrying out the method.

The influence of the percentage of the open cells of the foam and of the thickness of the foam panel treated, on how the drying and neutralizing stages are carried out has already been mentioned.

As concerns the drying and de-acidification stage for the foam the thickness of the panel and the percentage of the open cells affect the choice of the temperature and durtion of the treatment in the oven.

In varying these two factors, practically anhydrous panels can be obtained, as mentioned before, by carrying out the drying at temperatures of 100–140° C. and, better still, 100–130° C. for 1–3 hours. The anhydrous panel thus obtained has a residual acidity on the order of 1.15–1.6%.

By way of example, FIG. 1 shows the weight curve (I) and the residual acidity curve (II) as a function of time in hours (which is plotted as abscissae) for a temperature of 130° C. in respect of a panel having a thickness of 7 cm. obtained from a phenol foam with 53% of open cells.

It is clear from these two curves that the residual acidity plateau of 0.45% is reached within about 2 hours and that the 26% loss of weight plateau is reached within the same time limit.

Figure 2:
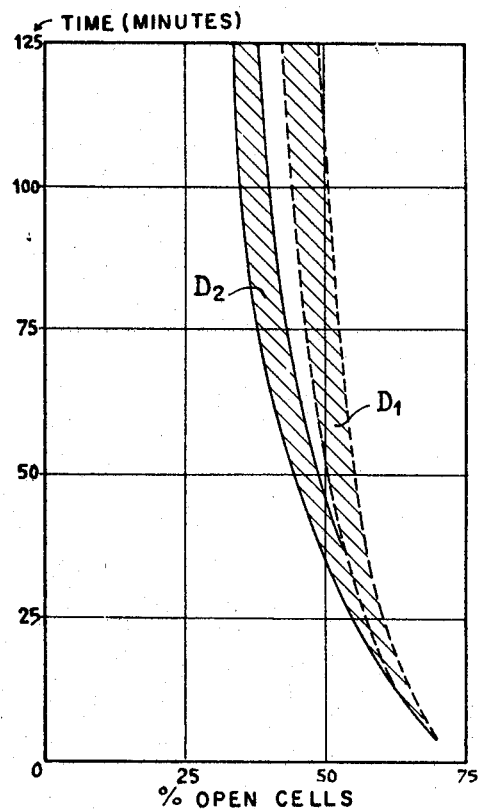
Figure 3:
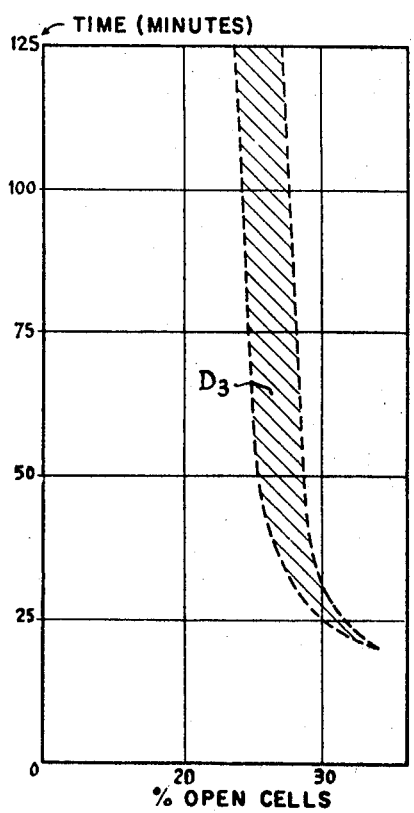

As concerns the neutralizing stage, reference will be had to FIGS. 2 and 3 which illustrate for various panels of given thickness the time curve of neutralization (expressed in minutes and plotted as ordinates) with gaseous ammonia as a function of the percentage of open cells of the foams (plotted as abscissae).

FIG. 2 relates to panels having a thickness of 7 cm.

Owing to the inevitable dispersion of the values obtained the results are inscribed in the zone $D_1$ defined by the two curves in dotted line.

Thus for these panels having a thickness of 7 cm. it is found that complete neutralization requires the presence of a minimum percentage of open cells of about 45% and that is achieved within 2 hours.

In respect of panels having a thickness of 3 cm. (FIG. 3), the results are inscribed in the zone $D_3$. It is found that complete neutralization only requires a minimum percentage of open cells of about 25% and is achieved within 2 hours, whereas with 30% of open cells the neutralization requires only 30 minutes.

These two curves show that the thicker the panel the higher the percentage of open cells required to obtain the complete neutralization by ammonia for a given period of time.

Further, there is an extremely interesting phenomena, namely the migration of the gaseous alkaline agent inside the foam panel, this migration being followed by the gradual change in the colour of the treated panel which changes, depending on the resins employed, from an orange-pink to a green-yellow, particularly when the foam contains phenol. This change is easily noticeable in a section of the panel. It has been observed that this migration is considerable with dry foam and with time leads to a complete neutralization of the treated panel if a minimum percentage of open cells is respected. This is interesting from the industrial point of view since the period during which the panel is exposed to an atmosphere of alkaline gas can be reduced, since, owing to the migration of the gas in the foam, the neutralization continues rather rapidly on its own at room temperature until it becomes complete. This complete neutralization is achieved when the whole of the section of the panel has a yellow-green colour.

The migration of the alkaline gas in the foam depends on the percentage of the open cells, on the thickness of the treated panel, on the quality of the vacuum in which this panel is placed and on the period of time for which it is exposed to an alkaline gas.

This migration is the more interesting as it permits reducing the minimum limit of the percentage of open cells required for obtaining a complete neutralization for a given panel thickness.

Thus, the curve of the period of exposure to the ammonia gas was plotted as a function of the percentage of open cells for obtaining complete neutralization by migration within 24 hours for a panel thickness of 7 cm. (FIG. 2, zone $D_2$).

In comparing the zones $D_1$ and $D_2$ it can be seen that the minimum limit of 45% of open cells is reduced to 35% to achieve a complete neutralization within 24 hours.

Moreover, it was observed that a panel having a thickness of 15 cm. obtained from a foam having 45% of open cells and put in contact with the ammonia gas for 45 minutes with a prior vacuum of 60 cm., was completely neutralized by migration within 24 hours, whereas only 68% of the volume of the panel had been neutralized at the end of the treatment, as indicated hereinbefore.

The following examples illustrate the invention, it being understood, however, that the scope of the latter is not intended to be limited thereby.

EXAMPLE 1

A phenol resin is prepared by condensing 940 g. of phenol with 1,400 g. of 30% aqueous formaldehyde solution at a pH of 9 with the addition of sodium hydroxide. Condensation is carried out at 90° C. until a content of 2% of free formol is obtained; this takes 80 minutes. The product is then neutralized to a pH of 7 with hydrochloric acid and distilled. In this way, a resin having a viscosity of 10,000 centipoises at 20° C. and a 75% dry extract is obtained.

The following mixture is then vigorously stirred: 1,000 g. of resol-type phenol resin in an aqueous solution having the aforementioned 75% dry extract, 1,000 cc. of pentane, and 45 g. of HCl having a concentration of 23° Bé.

This mixture is poured into a mould measuring 50 x 60 x 7 cm. and maintained at the temperature of 55° C. for 10 minutes. The foaming and hardening are effected during this time. It is then possible to strip from the mould a panel having a thickness of 7 cm. and a foam having 60% of open cells and a density of 0.05.

This panel is dried at 130° C. for 2 hours whereupon a loss of weight plateau is obtained. It is put under a suction or vacuum of 60 cm. (corresponding to a residual pressure of 16 cm. of mercury) within 10 minutes and thereafter exposed to a current of ammonia for 30 minutes. Within 48 hours in free air the treated panel has no longer any odour of ammonia. A Soxhlet extraction effected on a specimen of this panel for 12 hours with water at a pH of 7 at boiling temperature gives a final solution having a pH of about 6.9 measured with the pH meter. The residual acidity is therefore practically zero. This was checked by means of the accelerated corrosion test whose aforementioned detailed results were obtained with the foam of this example.

The various metals in contact with this specimen of the anhydrous and non-corrosive foam retain their brightness and even have a better appearance than the reference metal plate, above all in the case of mild steel. In comparative tests carried out with the following specimens: dried but non-neutralized foam, undried but neutralized foam, foam which had been neutralized and then dried; a very marked corrosion of the reference plate was observed in the three cases. The corrosion decreases in the foregoing order but is still very marked in the case of foam which had been neutralized and then dried.

An identical test carried out on a mild steel plate with a specimen of rigid polyurethane foam resulted in a complete blackening of the plate.

EXAMPLE 2

940 g. of phenol, 1,450 g. of 30% aqueous formaldehyde solution and 250 g. of cresol are condensed at a pH of 9 with the addition of sodium hydroxide. The condensation is effected at 95° C. for 1 hr. 35 minutes until a 2.3% content of free formol is reached. The product is then neutralized to a pH of 7. It is distilled and a resin having a viscosity of 10,800 centipoises at 20° C. and a 72% dry extract is obtained.

The following mixture is stirred vigorously: 500 g. of the aforementioned phenol resin, 50 cc. of hexane and 25 g. of HCl concentrated to 23° Bé.

This mixture is poured into a mould measuring 50 x 60 x 3 cm. and maintained at 60° C. for 12 minutes. The foaming and the hardening are carried out during this time. It is then possible to strip from the mould a panel having a thickness of 3 cm. and whose foam has 52% of open cells and a density of 0.045.

This panel is dried at 115° C. for 1 hour 30 minutes whereupon a weight loss plateau is reached. It is put under a vacuum of 60 cm. (corresponding to a residual pressure of 16 cm. of mercury) within 10 minutes and exposed to a current of ammonia for 20 minutes.

The residual acidity of this panel measured by extraction with the Soxhlet apparatus is practically nil. The accelerated corrosion test carried out as indicated hereinbefore gives results of the same order.

EXAMPLE 3

A mixed phenol-urea resin is prepared by condensing 7 kg. of phenol, 32 kg. of 30% aqueous formaldehyde solution and 5.5 kg. of urea at a pH of 6 with addition of sodium hydroxide. The condensation is carried out for 1 hour 10 minutes at 100° C., the content of free formaldehyde is then 5%, and the viscosity is 8 centipoises. The temperature is lowered to 75° C., the pH is adjusted to 8 with sodium hydroxide and the product is condensed for 2 hours 20 minutes at 90° C. The viscosity is 20 centipoises. The product is distilled under a vacuum until a viscosity of 2,000 centipoises is obtained.

The following mixture is then stirred vigorously:

1 kg. of the resin obtained hereinbefore with 100 cc. of pentane and 35 g. of HCl concentrated to 23° Bé.

This mixture is poured into a mould measuring 50 x 60 x 7 cm. and maintained at 45° C. for 20 minutes, the foaming and hardening occuring during this time. In this way, a foam having a density of 0.035 and 80% of open cells is obtained.

The panel, dried at 130° C. for 2 hours, no longer shows a loss of weight. It is put under a vacuum of 60 cm. within 10 minutes and exposed to a current of ammonia for 20 minutes.

A Soxhlet extraction of such a panel reveals a residual acidity which is practically nil.

EXAMPLE 4

2.380 kg. of 30% aqueous formaldehyde solution are adjusted to a pH of 8. Thereafter, 600 g. of phenol and 750 g. of melamine are added. The mixture is condensed at 80° C. until a 1:1.5 dilution with water is obtained. The mixture is then distilled under a vacuum until a viscosity of 4,000 centipoises is reached.

The following mixture is then vigorously stirred: 1 kg. of the aforementioned resin with 40 cc. of hexane and 35 g. of HCl concentrated to 23° Bé.

As before, this mixture is poured into a mould measuring 50 x 60 x 7 cm. and maintained at 45° C. for 20 min., the hardening and foaming occurring during this time.

In this way, a foam having a density of 0.04 and 70% of open cells is obtained. It is thereafter treated as in Example 3 with the same results.

EXAMPLE 5

1.370 kg. of 30% aqueous formaldehyde solution brought to a pH of 9 with sodium hydroxide is condensed with 390 g. of urea. The mixture is reflux heated for 30 min. and condensed for 30 min. The pH is lowered to 5 by the addition of formic acid and reflux condensed for 1 hr. 30 min. The pH is adjusted to 8 by means of sodium hydroxide and the mixture is distilled under a vacuum until a viscosity of 3,000 centipoises is reached. Thereafter, the following mixture is stirred vigorously:

1 kg. of the aforementioned resin, 100 g. of pentane and 23 g. of HCl concentrated to 23° Bé.

The mixture is poured into a mould measuring 50 x 60 x 7 cm. and maintained at 40° C. for 20 min., the foaming and hardening occurring during this time. In this way, a foam having a density of 0.03 and 85% of open cells is obtained. It is thereafter treated as in Example 3 with the same results.

Although specific examples of the invention have been given, it must be understood that the invention is not intended to be limited thereby.

Having now described our invention what we claim as new and desire to secure by Letters Patent is:

1. A method for preparing a foam resulting from the hardening, by means of an acid catalysis, of a thermosetting resin comprising as essential constituent the product of condensation of formaldehyde with at least one compound selected from the group consisting of phenols, amino derivatives the condensation of which with formaldehyde gives rise to aminoplastic resins and mixtures of both, said foam being anhydrous, non-acid and non-corrosive, said method comprising—in the course of the forming of said thermosetting resin in solution in a solvent selected from the group consisting of water and volatile organic solvents, said solution containing a foaming agent—employing an acid hardening catalyst having a high acidity and volatile and at the subsequent drying temperature, drying the hardened foam thus obtained at a temperature of 100–140° C. for about 1–3 hours so as to eliminate said solvent and the major part of the acid contained in the foam, and thereafter neutralizing the residual acid by means of a gaseous alkaline agent.

2. A method as claimed in claim 1, wherein the hardened foam is dried at a temperature of 100–130° C.

3. A method as claimed in claim 1, wherein said acid hardening catalyst is hydrochloric acid.

4. A method as claimed in claim 1, wherein said gaseous alkaline neutralizing agent is ammonia.

5. A method as claimed in claim 1, wherein the foam is put under a vacuum in the course of the neutralizing treatment.

6. A method as claimed in claim 1, wherein the neutralizing treatment is carried out by means of a gaseous alkaline agent under pressure.

7. A method as claimed in claim 10, wherein the neutralizing foam is covered with an insulating and protective varnish so as to protect it from the regain of moisture.

8. A method for preparing a foam resulting from the hardening, by means of an acid catalysis, of a thermosetting resin comprising as essential constituent the product of condensation of formaldehyde with at least one compound selected from the group consisting of phenols, amino derivatives the condensation of which with formaldehyde gives rise to aminoplastic resins and mixtures of both, said foam being anhydrous, non-acid and non-corrosive, said method comprising—in the course of the foaming of said thermosetting resin in solution in a solvent selected from the group consisting of water and volatile organic solvents, said solution containing a foaming agent—employing hydrochloric acid as hardening catalyst, drying the hardened foam thus obtained at a temperature of 100–140° C. for about 1–3 hours so as to eliminate said solvent and the major part of the acid contained in the foam, and thereafter neutralizing the residual acid by gaseous ammonia.

9. A method as claimed in claim 1, wherein said solution of thermosetting resin further contains usual adjuvants selected from surface active agents, modifying resins and fillers.

References Cited

UNITED STATES PATENTS

| | | | |
|---|---|---|---|
| 2,807,595 | 9/1957 | Brown | 260—2.5 |
| 3,138,563 | 6/1964 | Morgan et al. | 260—2.5 |
| 3,290,260 | 12/1966 | Buccigross | 260—2.5 |
| 3,284,379 | 11/1966 | Brasco et al. | 260—2.5 |
| 3,189,479 | 6/1965 | Coppick et al. | 117—98 |

MURRAY TILLMAN, Primary Examiner

W. J. BRIGGS, Sr., Assistant Examiner

U.S. Cl. X.R.

260—38, 39, 57, 59, 60, 67.6, 67.7, 70, 71